UNITED STATES PATENT OFFICE.

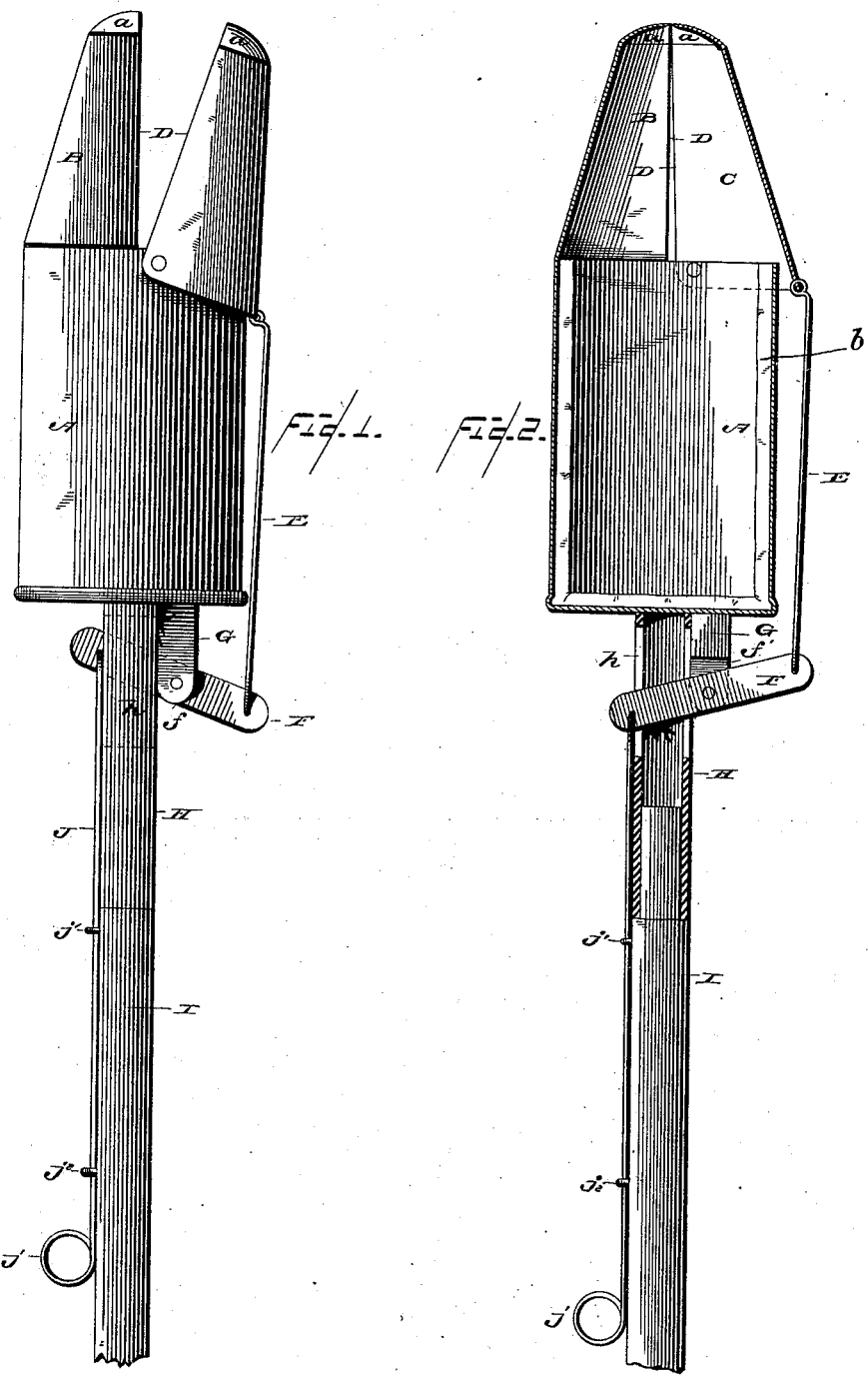

COLUMBIA LANCASTER YATES, OF HAMMONTON, NEW JERSEY.

FRUIT-GATHERER.

SPECIFICATION forming part of Letters Patent No. 351,824, dated November 2, 1886.

Application filed January 2, 1886. Serial No. 187,432. (No model.)

*To all whom it may concern:*

Be it known that I, COLUMBIA LANCASTER YATES, a citizen of the United States, residing at Hammonton, in the county of Atlantic and State of New Jersey, have invented a new and useful Improvement in Fruit-Gatherers, of which the following is a specification, reference being had to the accompanying drawings.

My invention relates to an improvement in fruit-gatherers, and more especially to that class of the same which are to be employed in gathering such fruit as apples, and the like.

The objects of the device are to provide a device which can be readily operated to gather the fruit without bruising, mashing, or otherwise injuring it, and which, by its freedom of manipulation, will save much time and labor.

A further object of the invention is to provide a device which will be simple in construction, light in weight, strong and durable, thoroughly effective, and easy to operate, and comparatively cheap to manufacture.

With these and other objects in view the improvement consists in the novel construction, combination, and arrangement of parts, as hereinafter fully described and claimed.

In the accompanying drawings, Figure 1 is a side elevation of my improved fruit-gatherer, and Fig. 2 is a vertical longitudinal section of the same, showing the jaws closed.

Referring to the drawings, in which like letters of reference denote like parts in all the figures thereof, A designates the barrel, body, or receiver, (cushioned on the inside with some soft material $b$,) which is cylindrical in form, and is closed at its rear or inner end, and has its front or forward end provided with a rigid conically-shaped jaw or knife, B, said rigid jaw or knife occupying about one-half of the top portion of the barrel, body, or receiver. Pivoted to the top of the receiver or barrel, on the side opposite to the rigid jaw or knife, is a movable jaw or knife, C, conical in form, and of a shape corresponding to the rigid jaw B. The front ends of these jaws are provided with lips $a$, that close the upper ends thereof, and form cutting-edges to sever the fruit, and said jaws are also provided with side cutting-edges, D and D. Attached to the lower end of the movable jaw or knife, at or about the center, is a rod, E, which is attached or connected to one end of a lever, F. This lever is fulcrumed at an intermediate point of its length between the bifurcated portions $f f'$ of a post, G, which is rigidly attached to or formed integral with the rear end of the receiver, barrel, or body A.

Depending from the rear end of the receiver or barrel is a tube, H, forming a ferrule for the top of the handle I. This tube or ferrule is provided with a vertical passage, $h$, to allow one end of the lever F to pass through, and also permit an upward and downward movement therein of the same.

Connected to the free end of the lever F is one end of the operating-rod J. This rod is provided on its rear end with a knob, loop, or handle, $j$, and is connected to the handle by staples $j' j^2$, or in any suitable manner to guide the movement of the said rod and prevent detachment or separation of the rod J from the handle.

The operation of my device will be readily understood from the foregoing description, taken in connection with the annexed drawings. The jaws are thrown open, as shown in Fig. 1, passed over the fruit so as to inclose the same, and the operating-rod J is drawn down, causing the rod which is connected to the movable jaw to move upward, bringing the cutting-edges of the movable and rigid jaws together, thus severing the fruit, which drops or descends into the receiver, barrel, or body A. The latter may be emptied of its contents when filled.

The advantages of my invention are numerous.

By the improvement small fruit can be gathered without injury thereto, and much time and labor can be saved, as the device is manifestly capable of operation with ease and rapidity. It can be worked by one up in the tree to gather fruit out beyond their reach.

I do not wish to be limited to the precise construction herein shown and described, as many modifications may be made therein without departing from the spirit or scope of my invention.

I claim as my invention—

1. In a fruit-gatherer, the combination of a staff or handle, a receiver rigidly affixed to one end thereof, and having an open upper end, a rigid jaw, B, partially closing the upper open end of the receiver, and having the side cutting-edges and the closed upper end, *a*, extending over the jaw and the receiver, and forming a cutting-edge, a movable jaw, C, pivoted to the receiver at the open end of the latter, and having the side cutting-edges and the closed upper end, *a*, also forming a cutting-edge, and a rod for operating the movable jaw to cause the cutting-edges of the latter to come in contact with the cutting-edges of the rigid jaw and entirely close the open end of the receiver, substantially as described, for the purpose set forth.

2. The fruit-gatherer comprising the receiver, the rigid and movable jaws, the rod attached to the movable jaw, the operating-lever, the post or lug depending from the rear portion of the receiver, said post being bifurcated to provide pivots for the lever, a handle secured to the receiver, the operating-rod attached to the operating-lever and held from lateral displacement from the handle by staples or any suitable means, all the parts combined and operating for the purpose set forth.

In testimony that I claim the foregoing as my own I have hereto affixed my signature in presence of two witnesses.

COLUMBIA LANCASTER YATES.

Witnesses:
  E. R. JONES,
  H. H. TYLER.